(12) United States Patent
Park et al.

(10) Patent No.: US 12,172,496 B2
(45) Date of Patent: Dec. 24, 2024

(54) GAS-LIQUID SEPARATION DEVICE FOR VEHICLE HEAT PUMP SYSTEM HAVING THE SAME

(71) Applicants: HYUNDAI MOTOR COMPANY, Seoul (KR); KIA CORPORATION, Seoul (KR)

(72) Inventors: Jong Il Park, Hwaseong-si (KR); Seong-Bin Jeong, Hwaseong-si (KR); Seongjae Lee, Suncheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 366 days.

(21) Appl. No.: 17/867,526

(22) Filed: Jul. 18, 2022

(65) Prior Publication Data
US 2023/0202262 A1   Jun. 29, 2023

(30) Foreign Application Priority Data
Dec. 28, 2021   (KR) .......................... 10-2021-0190014

(51) Int. Cl.
| | |
|---|---|
| *B60H 1/32* | (2006.01) |
| *F25B 39/04* | (2006.01) |
| *F25B 41/40* | (2021.01) |
| *F25B 43/02* | (2006.01) |

(52) U.S. Cl.
CPC ......... *B60H 1/3229* (2013.01); *B60H 1/3228* (2019.05); *F25B 39/04* (2013.01); *F25B 41/40* (2021.01); *F25B 43/02* (2013.01)

(58) Field of Classification Search
CPC .. F25B 2400/13; F25B 2400/23; F25B 39/04; F25B 41/40; F25B 43/00; F25B 43/02; F25B 43/043; F25B 43/003; F25B 2400/16; B60H 1/32; B60H 1/3229; B60H 1/00921; B60H 1/00278; B60H 1/00321; B60H 1/00385
See application file for complete search history.

(56) References Cited

U.S. PATENT DOCUMENTS

2021/0180843 A1\*   6/2021   Azzouz .................. F25B 43/003

\* cited by examiner

*Primary Examiner* — Len Tran
*Assistant Examiner* — Kamran Tavakoldavani
(74) *Attorney, Agent, or Firm* — MCDONNELL BOEHNEN HULBERT & BERGHOFF LLP

(57) ABSTRACT

A gas-liquid separation device for a vehicle according to an embodiment of the present disclosure includes: a housing with an upper surface that is opened and a lower surface that is closed; a cover mounted on the opened upper surface to close and seal the interior of the housing, and including an outlet and an inlet, and a mount hole; an exhaust pipe mounted on the cover; a guide pipe with an upper surface that is opened so that the exhaust pipe is inserted inside, and forms a gas refrigerant flow space between the exterior circumference and the interior circumference of the exhaust pipe; a mount cap mounted inside the closed lower end of the housing; a refrigerant guider to prevent the liquid refrigerant of the refrigerant inflowed into the inlet from flowing into the gas refrigerant flow space, and fixed to the exhaust pipe; and a receiver dryer.

22 Claims, 9 Drawing Sheets

GAS-LIQUID SEPARATION DEVICE FOR VEHICLE HEAT PUMP SYSTEM HAVING THE SAME

CROSS-REFERENCE TO RELATED APPLICATION

This application claims priority to and the benefit of Korean Patent Application No. 10-2021-0190014 filed in the Korean Intellectual Property Office on Dec. 28, 2021, the entire contents of which are incorporated herein by reference.

BACKGROUND

The present disclosure relates to a gas-liquid separation device for a vehicle and a heat pump system having the same. More particularly, the present disclosure relates to a gas-liquid separation device for a vehicle for separately supplying gas and liquid refrigerants, respectively, and to a heat pump system having the same.

In general, an air conditioning system for a vehicle includes an air conditioning device that circulates a refrigerant in order to heat or cool the interior of the vehicle.

The air conditioning device maintains a comfortable indoor environment by maintaining the vehicle's indoor temperature at an appropriate temperature regardless of external temperature changes, and is configured to heat or cool the interior of the vehicle by heat-exchange by an evaporator while a refrigerant discharged by operation of a compressor circulates back to the compressor through a condenser, a receiver dryer, an expansion valve, and the evaporator.

That is, in the summer cooling mode, the air conditioning device decreases the indoor temperature and humidity through evaporation in the evaporator through the receiver dryer and expansion valve after a high temperature and high pressure gas refrigerant compressed by the compressor is condensed through the condenser.

However, in the conventional air condition device, the receiver drier for supplying a liquid refrigerant removed with moisture and foreign substances among the refrigerant condensed in the condenser to an expansion valve and an accumulator for supplying a gas refrigerant among the refrigerant passing through the evaporator to the compressor are respectively provided, but there is a problem that a manufacturing cost increases due to the increasing of the constituent elements.

Also, it is difficult to ensure a space to mount the receiver drier and the accumulator inside the small engine compartment and there is a problem that a layout of connection pipes is complicated.

The above information disclosed in this Background section is only for enhancement of understanding of the background of the disclosure, and therefore it may contain information that does not form the prior art that is already known in this country to a person of ordinary skill in the art.

SUMMARY

The present disclosure, to solve these problems, provides a gas-liquid separation device that separates and stores each refrigerant supplied according to a mode of a vehicle into a gas refrigerant and a liquid refrigerant, and selectively supplies the separated gas refrigerant and liquid refrigerant to a compressor, a heat-exchanger, and a sub-condenser, respectively, and a heat pump system including the same.

A gas-liquid separation device for a vehicle according to an embodiment of the present disclosure includes: a housing with an upper surface that is opened and a lower surface that is closed based on a length direction; a cover mounted on the opened upper surface of the housing to close and seal the interior of the housing, and including an outlet and an inlet formed in the center and on one side, respectively, and a mount hole formed on the other side; an exhaust pipe mounted on the cover so that the upper part protrudes from the outlet; a guide pipe formed with a cylinder shape with an upper surface that is opened so that the exhaust pipe is inserted inside, and forming a gas refrigerant flow space between the exterior circumference and the interior circumference of the exhaust pipe; a mount cap mounted inside the closed lower end of the housing to fix the lower end of the guide pipe; a refrigerant guider disposed on the cover side in the inside of the housing to prevent the liquid refrigerant of the refrigerant inflowed into the inlet from flowing into the gas refrigerant flow space, and fixed to the exhaust pipe; and a receiver dryer mounted through the mount hole so that the upper part is protruded to the outside of the cover and the lower part is disposed inside the housing.

In the guide pipe, at least one fixing rib on the lower interior circumference may be formed to be protruded toward the center of the guide pipe so that the exhaust pipe is fixed to the inner lower part of the guide pipe.

In the guide pipe, an oil exhaust part protruded from the lower center toward the inner lower surface of the housing and equipped with an oil hole to communicate with the housing may be formed.

In the housing, an oil collecting part protruded from the lower surface of the housing toward the lower part by corresponding to the oil exhaust part may be integrally formed.

In the oil collecting part, when the oil included in the gas refrigerant flowing in the gas refrigerant flow space is exhausted into the oil hole, the oil may be collected by its own weight from the oil exhaust part.

In the mount cap, the upper surface may be opened and the lower surface may be closed so that the lower end of the guide pipe is partially inserted, and at least one opening hole may be formed along the circumferential direction to allow the liquid refrigerant stored inside the housing to flow.

The exhaust pipe may include: a fixing groove formed at the upper end to be fixed to the cover at a position where the upper end is protruded outward from the cover at a regular interval; and a mount groove formed in a position spaced from the fixing groove toward the lower part so that the refrigerant guider is positioned on the upper part at the inside of the housing, and for fixing the refrigerant guider.

The interior circumference of the inlet may be inserted into the fixing groove and fixed, and the interior circumference of the inserting groove formed in the refrigerant guider may be inserted into the mount groove and fixed.

The inlet may be connected to a heat-exchanger, or an evaporator, or an internal condenser for condensing or evaporating the refrigerant, and the outlet may be connected to a compressor.

The receiver dryer may include a body part provided with a drying material inside; an inflow port formed at the upper end of the body part protruded from the mount hole to the outside of the cover; and an exhaust port connected with the body part on the inside of the housing and protruded outside the lower part of the housing.

The inflow port may be selectively connected to an internal condenser or a heat-exchanger, and the exhaust port may be selectively connected to the heat-exchanger or the sub-condenser.

In the housing, a refrigerant storage unit may be formed in a predetermined section from the lower part toward the upper part based on the length direction.

The receiver dryer may be positioned on the refrigerant storage unit with the lower end disposed on the inside of the housing.

Also, a heat pump system equipped with a gas-liquid separation device for a vehicle according to an embodiment of the present disclosure includes: a first cooling apparatus including a first radiator and a first water pump connected to a first coolant line, and circulating a coolant in the first coolant line to cool at least one electrical component and at least one motor; a second cooling apparatus including a second water pump connected to the second coolant line and circulating a coolant in the second coolant line; a battery module provided on a battery coolant line selectively connected to the second coolant line through a first valve; an air conditioner device circulating a refrigerant in the refrigerant line to control the temperature of the vehicle interior by using a phase change of the refrigerant, and including a gas-liquid separation device as above-described; and a chiller provided in the battery coolant line and through which a coolant passes, connected to the air conditioner device through a chiller connection line, and heat-exchanging a coolant selectively inflowed with a refrigerant selectively suppled through the chiller connection line to adjust a temperature of a coolant, wherein the gas-liquid separation device may be selectively connected to a heat-exchanger, an internal condenser, an evaporator, and a sub-condenser included in the air conditioner device.

The air conditioner device may include: an HVAC module connected through the refrigerant line, and equipped with an opening/closing door for selectively inflowing external air that has passed through the evaporator to the internal condenser according to the cooling, heating, and dehumidification mode of the vehicle; a heat-exchanger connected to the first and second coolant lines so that the coolant circulating in the first and second cooling apparatus passes therein, respectively, and connected to the refrigerant line; a first expansion valve provided on the refrigerant line connecting the heat-exchanger and the evaporator; a compressor connected through the refrigerant line between the evaporator and the internal condenser; a second expansion valve provided on the chiller connection line; a first bypass line connecting the refrigerant line connecting the evaporator and the gas-liquid separation device, and the heat-exchanger, so that a refrigerant that has passed through the heat-exchanger is selectively inflowed to the gas-liquid separation device; a third expansion valve provided on the refrigerant line between the internal condenser and the heat-exchanger; and a second bypass line connecting the refrigerant line between the heat-exchanger and the third expansion valve and the refrigerant line between the first expansion valve and the evaporator so that a refrigerant that has passed through the internal condenser selectively inflows into the evaporator.

The sub-condenser may be provided on the refrigerant line connecting the gas-liquid separation device and the evaporator, and the sub-condenser, and when the heat-exchanger condenses the refrigerant, may further condense the refrigerant condensed in the heat-exchanger through heat-exchange with the outside air.

A first refrigerant valve provided on the refrigerant line connecting the internal condenser and the heat-exchanger; a second refrigerant valve provided on the refrigerant line connecting the gas-liquid separation device and the sub-condenser; a first refrigerant connection line including one end connected to the refrigerant line connecting the heat-exchanger and the gas-liquid separation device and the other end connected to the first refrigerant valve; and a second refrigerant connection line connecting the first refrigerant valve and the second refrigerant valve, may be further included.

One end of the first bypass line may be connected to the refrigerant line through a third refrigerant valve provided on the refrigerant line connecting the heat-exchanger and the gas-liquid separation device, the other end of the first bypass line may be connected to the refrigerant line between the evaporator and the gas-liquid separation device, and a fourth refrigerant valve may be provided on the second bypass line.

In a case of an indoor cooling mode of a vehicle, the first and second bypass lines may be closed by the operation of the third and fourth refrigerant valves, the first and second refrigerant connection lines may be closed by the operation of the first and second refrigerant valves, the gas-liquid separation device may remove a gas refrigerant from the refrigerant passing through the heat-exchanger, and then supply a liquid refrigerant to the sub-condenser and remove the liquid refrigerant from the refrigerant passing through the evaporator and then supply the gas refrigerant to the compressor.

In a case of the indoor heating mode of the vehicle, the refrigerant line connecting the heat-exchanger and the gas-liquid separation device may be closed by the operation of the third refrigerant valve, the first bypass line may be opened by the operation of the third refrigerant valve, the second bypass line may be closed by the operation of the fourth refrigerant valve, the first and second refrigerant connection lines may be opened by the operation of the first and second refrigerant valves, and the gas-liquid separation device may remove a gas refrigerant from a refrigerant supplied from the internal condenser through the first refrigerant connection line and then supply a liquid refrigerant to the heat-exchanger through the second refrigerant connection line, and remove a liquid refrigerant from a refrigerant passing through the heat-exchanger and then supply a gas refrigerant to the compressor.

The first refrigerant valve may be a 4-way valve, the second and third refrigerant valves may be 3-way valves, and the fourth refrigerant valve may be a 2-way valve.

The second expansion valve may be operated when cooling the battery module by using a coolant that is heat-exchanged with a refrigerant and expand a refrigerant inflowed through the chiller connection line to be inflowed to the chiller.

The third expansion valve may expand a refrigerant supplied from the internal condenser when dehumidification is required in the indoor heating mode of the vehicle, and the fourth refrigerant valve may open the second bypass line so that the refrigerant expanded by the operation of the third expansion valve inflows to the second bypass line.

The second and third expansion valves may be electronic expansion valves that selectively expand a refrigerant while controlling the flow of a refrigerant.

As above-described, according to the gas-liquid separation device 100 for the vehicle and the heat pump system having the same according to an embodiment of the present disclosure, by dividing the refrigerant supplied according to the mode of the vehicle into the gas refrigerant and the liquid refrigerant and storing them, and selectively supplying the separated gas refrigerant and liquid refrigerant to the compressor the heat-exchanger, or the sub-condenser, respectively, there is an effect that it is possible to reduce the production cost by reducing the entire constituent elements of the air conditioner device.

In addition, as the present disclosure simultaneously performs the functions of the receiver dryer and the accumulator, which were conventionally configured separately, there is also an effect that a mount space may be secured through the reduction of constituent elements, and simultaneously a layout may be simplified.

In addition, there is an effect that the present disclosure may improve the cooling and heating performance of the air conditioner device 50 by minimizing the flow rate of the refrigerant accumulated therein to increase the flow rate of the refrigerant circulating during the indoor cooling or heating of the vehicle.

Furthermore, the present disclosure may reduce the weight through the simplification of the entire system, and may improve the space utilization.

DETAILED DESCRIPTION OF THE EMBODIMENTS

Figure 1:
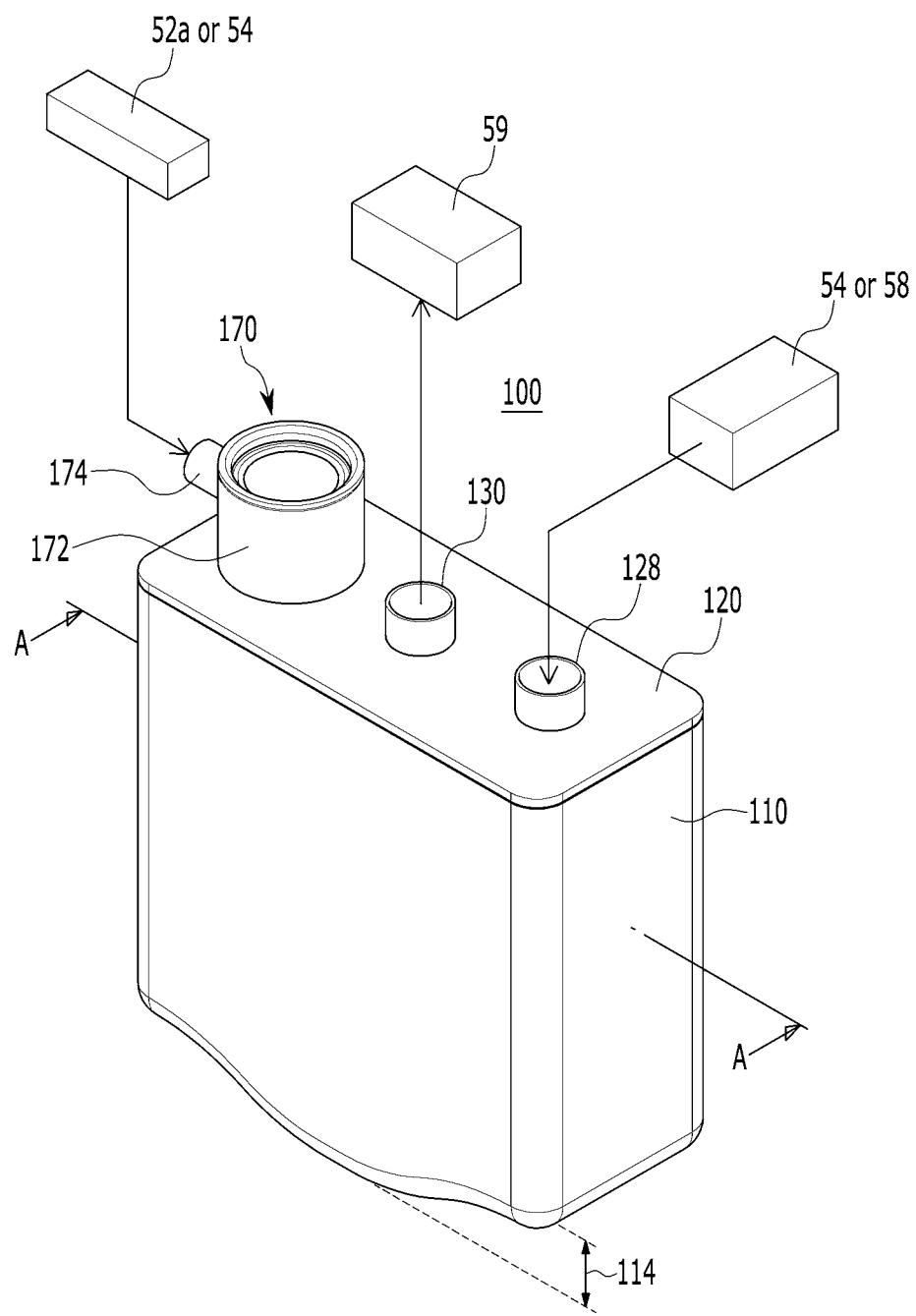
FIG. 1 is a perspective view of a gas-liquid separation device for a vehicle according to an embodiment of the present disclosure.

An embodiment of the present disclosure will hereinafter be described in detail with reference to the accompanying drawings.

Embodiments described in the present specification and a configuration shown in the drawings are just the most preferable embodiments of the present disclosure, but are not limited to the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, and the present disclosure is not necessarily limited thereto, and in the drawings, the thicknesses of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

Figure 2:
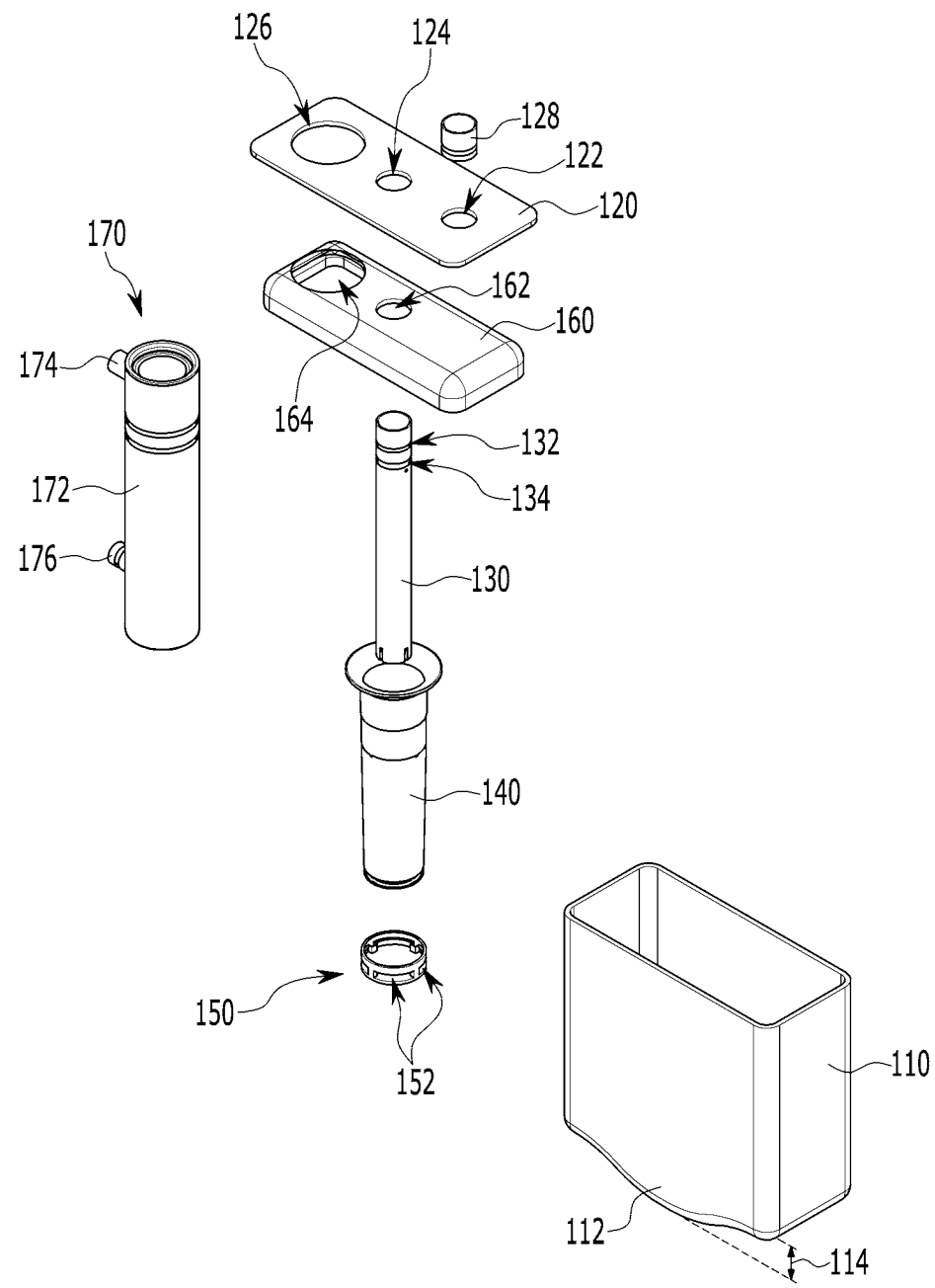
FIG. 2 is an exploded perspective view of a gas-liquid separation device for a vehicle according to an embodiment of the present disclosure.
Figure 3:
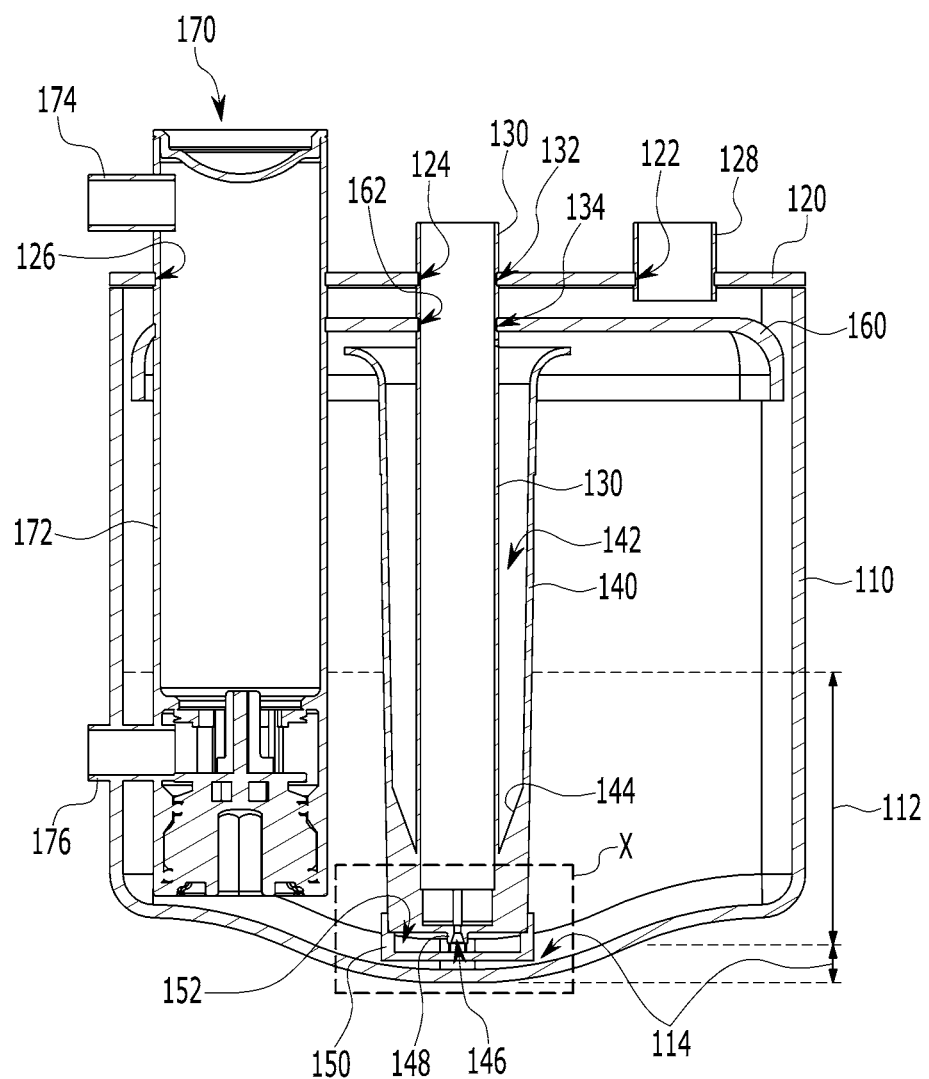
FIG. 3 is an enlarged view of a part X of FIG. 2.
Figure 4:
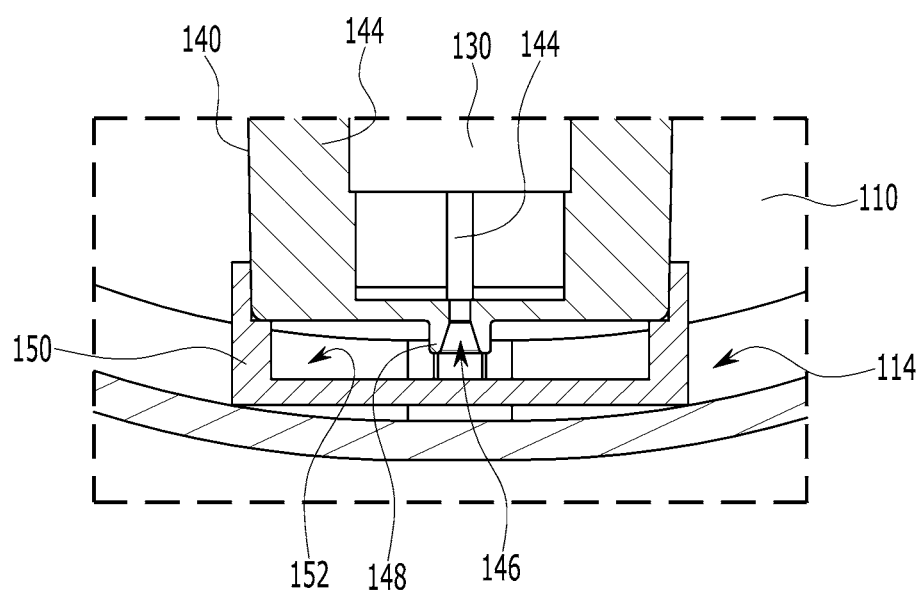
FIG. 4 is a cross-sectional view taken along a line A-A of FIG. 1.
Figure 5:
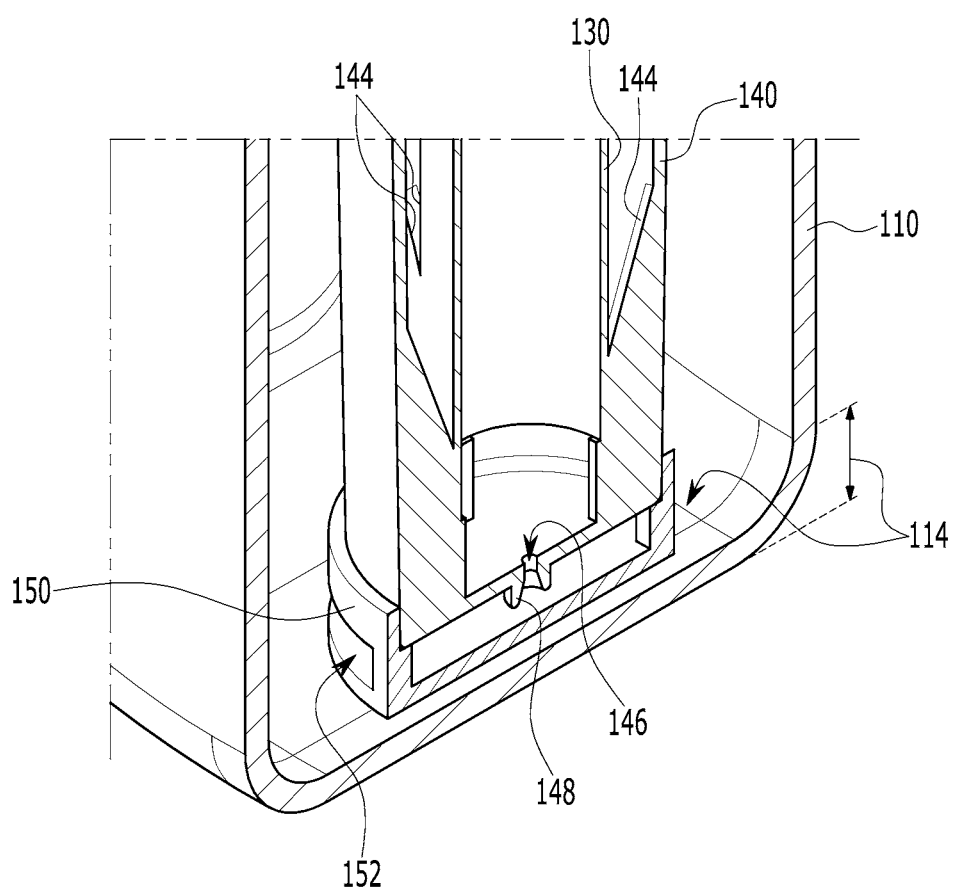
FIG. 5 is a partially cut-away perspective view of a gas-liquid separation device for a vehicle according to an embodiment of the present disclosure.

FIG. 1 is a perspective view of a gas-liquid separation device for a vehicle according to an embodiment of the present disclosure, FIG. 2 is an exploded perspective view of a gas-liquid separation device for a vehicle according to an embodiment of the present disclosure, FIG. 3 is an enlarged view of a part X of FIG. 2, FIG. 4 is a cross-sectional view taken along a line A-A of FIG. 1, and FIG. 5 is a partially cut-away perspective view of a gas-liquid separation device for a vehicle according to an embodiment of the present disclosure.

Referring to drawings, a gas-liquid separation device 100 for a vehicle according to an embodiment of the present disclosure may divide each refrigerant supplied from a heat-exchanger 54 or an evaporator 58, or an internal condenser 52a, which condense and evaporate the refrigerant according to a mode of the vehicle, into a gas refrigerant and a liquid refrigerant and store them, and selectively supply the divided gas refrigerant and liquid refrigerant to a compressor 59, the heat-exchanger 54, or a sub-condenser 56.

Here, the heat-exchanger 54 may be a water-cooled heat exchanger that heat-exchanges the refrigerant with a coolant.

To this end, the gas-liquid separation device 100 for the vehicle according to an embodiment of the present disclosure, as shown in FIG. 1 to FIG. 5, may include a housing 110, a cover 120, an exhaust pipe 130, a guide pipe 140, a mount cap 150, a refrigerant guider 160, and a receiver dryer 170.

First, the housing 110 may be formed in a hollow box shape in which the upper surface is opened and the lower surface is closed based on the length direction.

Here, the housing 110 may have a refrigerant storage unit 112 formed in a predetermined section from the lower part to the upper part based on the length direction.

The liquid refrigerant in a low temperature state is stored in the refrigerant storage unit 112, and the lower part of the receiver dryer 170 to be described later may be partially submerged in the stored liquid refrigerant.

The cover 120 is mounted on the opened upper surface of the housing 110 to close and seal the inside of the housing 110. An inlet 122 and an outlet 124 may be formed on one side and a center of the cover 120, respectively, and a mount hole 126 may be formed on the other side.

Here, the inlet 122 may be connected to the heat-exchanger 54 or the evaporator 58. A connection port 128 may be mounted in the inlet 122.

The outlet 124 may be connected to the compressor 59 through an exhaust pipe 130, which will be described later.

That is, the liquid refrigerant of the refrigerant inflowed from the heat-exchanger 54 or the evaporator 58 to the inside of the housing 110 through the inlet 122 may be stored in the refrigerant storage unit 112.

In the present embodiment, the exhaust pipe 130 is inserted into the interior of the housing 110 and may be mounted on the cover 120 so that the upper end is protruded from the outlet 124 to a certain degree.

The guide pipe 140 is formed in a cylinder shape with an opened upper surface so that the exhaust pipe 130 is inserted therein. A gas refrigerant flow space 142 may be formed between the interior circumference of this guide pipe 140 and the exterior circumference of the exhaust pipe 130.

The gas refrigerant may inflow into the gas refrigerant flow space 142, and the gas refrigerant that has passed through the gas refrigerant flow space 142 may be exhausted through the exhaust pipe 130.

Here, the exhaust pipe 130 may be disposed at a position spaced apart from the lower end of the guide pipe 140 toward the upper part by a predetermined space. Accordingly, the gas refrigerant inflowed into the gas refrigerant flow space 142 may be smoothly inflowed from the lower part of the guide pipe 140 to the opened lower end of the exhaust pipe 130.

Here, in the guide pipe 140, at least one fixing rib 144 on the lower interior circumference may be protruded toward the center of the guide pipe 140 so that the exhaust pipe 130 is fixed to the inner lower part of the guide pipe 140.

In the present embodiment, the fixing rib 144 may be formed in positions spaced apart at a 90° angle along the interior circumference of the guide pipe 140, respectively.

Accordingly, when the exhaust pipe 130 is inserted inside the guide pipe 140, the lower exterior circumference of the exhaust pipe 130 is supported to the fixing ribs 144, so that it may be stably fixed inside the guide pipe 140.

On the other hand, in the present embodiment, it is described that the fixing ribs 144 are spaced apart at a 90° angle along the circumferential direction on the interior circumference of the guide pipe 140 to form four as an embodiment, but it is not limited thereto, and the positions and number of the fixing ribs 144 may be changed and applied.

In the present embodiment, the mount cap 150 may be mounted inside the closed lower end of the housing 110 to fix the lower end of the guide pipe 140 to the inside of the housing 110.

Here, in the mount cap 150, the upper surface is opened, and the lower surface may be closed so that the lower end of the guide pipe 140 may be partially inserted in a predetermined part.

In addition, at least one opening hole 152 may be formed in the mount cap 150 along the circumferential direction so that the liquid refrigerant stored in the inner lower part of the housing 110 flows.

Here, four of the opening holes 152 may be formed at positions spaced apart at a predetermined angle along the circumferential direction of the mount cap 150, respectively.

The opening hole 152 may smoothly flow the liquid refrigerant when the liquid refrigerant is stored in the refrigerant storage unit 112. Accordingly, the liquid refrigerant stored in the refrigerant storage unit 112 may be stored in the refrigerant storage unit without obstruction of the flow by the mount cap 150.

In the present embodiment, the refrigerant guider 160 is disposed proximately to the cover 120 side in the interior of the housing 110 to prevent the liquid refrigerant from inflowing into the gas refrigerant flow space 142 among the refrigerant inflowed into the inlet 122.

This refrigerant guider 160 is formed in a circular cup shape and may be fixed to the upper part of the exhaust pipe 130.

Here, a fixing groove 132 and a mount groove 134 may be formed in the exhaust pipe 130 to correspond to the cover 120 and the refrigerant guider 160.

The fixing groove 132 may be formed at the upper end so that the upper end of the exhaust pipe 130 is fixed to the cover 120 at a position protruded from the cover 120 to the outside at a predetermined interval.

The interior circumference of the inlet 122 may be hung on the fixing groove 132 to be fixed.

That is, the exhaust pipe 130 may be fixed to the cover 120 while the lower part is inserted into the housing by fitting the interior circumference of the outlet 124 into the fixing groove 132.

Also, the mount groove 134 may be formed at a position spaced from the fixing groove 132 toward the lower part so that the refrigerant guider 160 is positioned at the upper part inside the housing 110.

Here, the interior circumference of the inserting groove 162 formed in the refrigerant guider 160 may be inserted into the mount groove 134 and fixed.

Accordingly, the refrigerant guider 160 is fixed to the exhaust pipe 130 at a position spaced apart to the lower part from the cover 120 in the inner upper part of the housing 110.

That is, the refrigerant guider 160 may be formed in a shape in which the circumference is bent toward the lower part of the housing 110, the lower surface is opened, and the upper surface is closed.

This refrigerant guider 160 may be assembled by being inserted into the upper end of the exhaust pipe 130 through an inserting groove 162 formed in the center.

At this time, the mount groove 134 may be inserted into the inserting groove 162 of the refrigerant guider 160 so that the refrigerant guider 160 is fixed to the upper part of the exhaust pipe 130, thereby fixing the refrigerant guider 160. Accordingly, the refrigerant guider 160 may be fixed to the upper part of the exhaust pipe 130.

Also, the receiver dryer 170 may be mounted through the mount hole 126 so that the upper end is protruded to the outside of the cover 120 and the lower end is disposed inside the housing 110.

On the other hand, an insertion hole 164 may be formed in the refrigerant guider 160 to correspond to the position of the mount hole 126 so that the receiver dryer 170 is inserted.

In the present embodiment, the receiver dryer 170 includes a body part 172, an inflow port 174, and an exhaust port 176.

First, the body part 172 may be formed into a hollow pipe shape in which the inside of the upper surface or the lower surface is closed and sealed by a separately assembled fixing member. A drying material may be provided inside the body part 172.

The drying material may remove a foreign material and moisture contained in the refrigerant.

The inflow port 174 may be formed at the upper end of the body part 172 protruded from the mount hole 126 to the outside of the cover 120.

Here, the inflow port 174 may be selectively connected to the internal condenser 52a or the heat-exchanger 54.

Also, the exhaust port 176 may be connected with the body part 172 inside the housing 110 and protruded out of the lower side of the housing 110.

The exhaust port 176 may be selectively connected to the heat-exchanger 54 or the sub-condenser 56.

Here, the receiver dryer 170 may be positioned at the refrigerant storage unit 112 with the lower end disposed inside the housing 110.

That is, the lower end of the body part 172 in which the exhaust port 176 is positioned may be positioned at the refrigerant storage unit 112 formed in the housing 110.

Accordingly, while passing through the body part 172, the refrigerant in high temperature and high pressure state from which moisture and foreign substances are removed may be heat-exchanged with the refrigerant in the low temperature and low pressure state stored in the refrigerant storage unit 112.

Then, while passing through the receiver dryer 170, as the refrigerants in the gas state that are not condensed are heat-exchanged with the refrigerant in the low temperature and low pressure state stored in the refrigerant storage unit 112, dryness decreases, and a phase change may occur simultaneously in a liquid state.

Accordingly, the flow rate of the liquid refrigerant exhausted through the exhaust port 176 may be increased.

In addition, while the refrigerant in the low temperature/low pressure state stored in the refrigerant storage unit 112 is heat-exchanged with the refrigerant in the high temperature/high pressure state passing through the receiver dryer 170, the dryness increases and simultaneously the phase change into the gas state may occur.

Accordingly, the flow rate of the gas refrigerant exhausted through the exhaust pipe 130 may be increased.

That is, the gas-liquid separation device 100 may increase the overall flow rate of the refrigerant circulated in the air conditioner device 50 through the operation as described above. Due to this, the cooling and heating performance of the air conditioner device 50 may be improved.

On the other hand, in the present embodiment, in the guide pipe 140, as shown in FIG. 3 to FIG. 5, the oil exhaust part 148 provided with the oil hole 146 to be protruded from the bottom center toward the inner lower surface of the housing 110 and communicate with the interior of the housing 110 may be integrally formed.

Here, when the oil included in the gas refrigerant flowing in the gas refrigerant flow space 142 falls to the lower part by its own weight, the oil hole 146 may exhaust it to the outside of the guide pipe 140.

On the other hand, in the housing 110, the oil collecting part 114 protruded from the lower surface of the housing 110 toward the lower part in response to the oil exhaust part 148 may be integrally formed.

In the oil collecting part 114, when the oil included in the gas refrigerant flowing in the gas refrigerant flow space 142 is exhausted to the oil hole 146, it may be collected by the exhausted weight of the oil.

Therefore, the gas-liquid separation device 100 may improve the performance and durability of the compressor 59 by supplying the gas refrigerant of which an oil content is minimized to the compressor 59.

Hereinafter, the operation and action of the gas-liquid separation device 100 for the vehicle according to an embodiment of the present disclosure configured as described above is described in detail.

Figure 6:
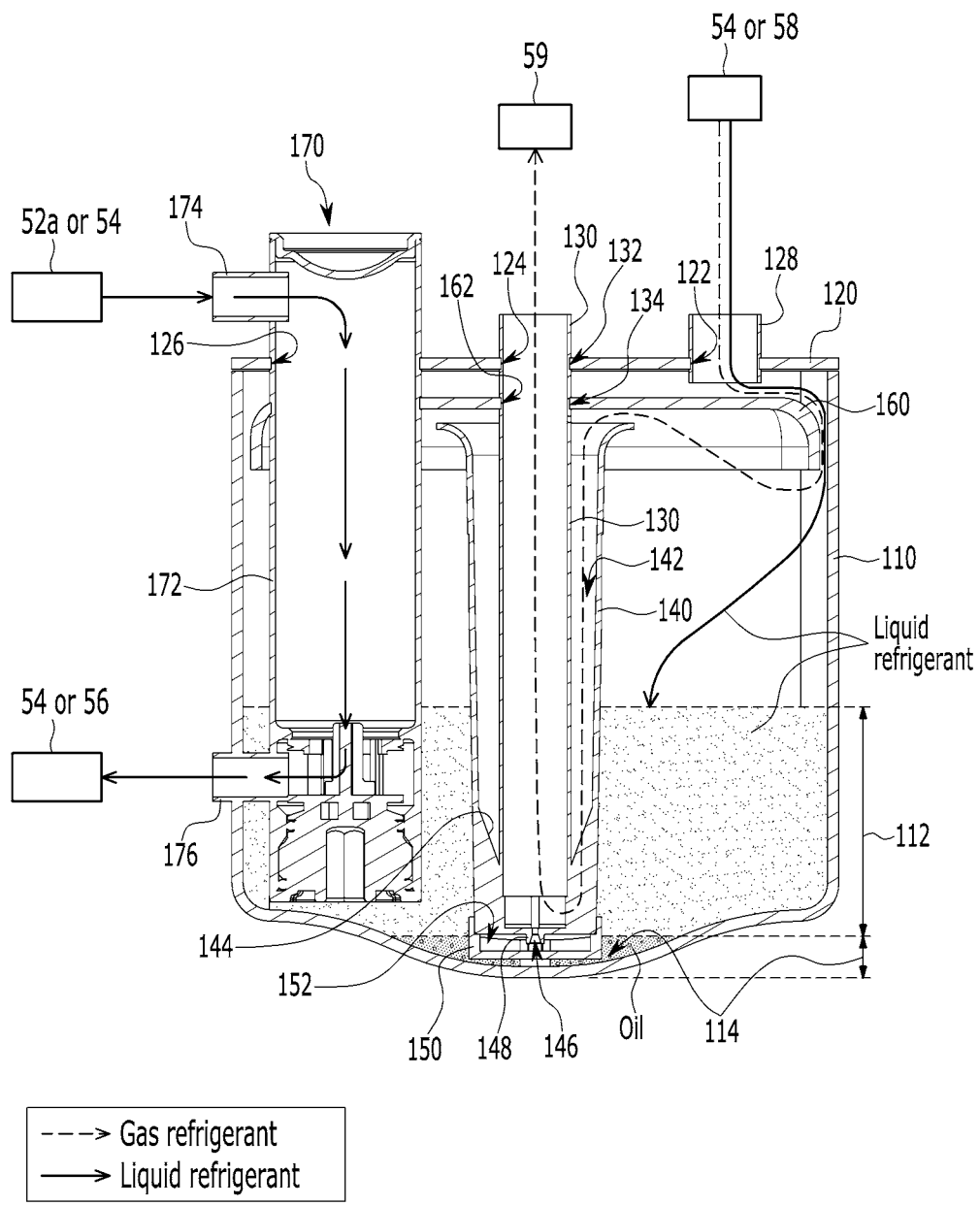
FIG. 6 is a use state diagram of a gas-liquid separation device for a vehicle according to an embodiment of the present disclosure.

FIG. 6 is a use state diagram of a gas-liquid separation device for a vehicle according to an embodiment of the present disclosure.

Referring to FIG. 6, the refrigerant heat-exchanged in the heat-exchanger 54 or the evaporator 58 is inflowed inside the housing 110 through the inlet 122 in the state that gas and liquid are mixed.

The mixed refrigerant inflowed into the inlet 122 is prevented from inflowing into the gas refrigerant flow space 142 by the refrigerant guider 160 whose upper surface is closed, and flows along the inner surface of the housing 110 to the lower part of the housing 110.

Accordingly, the gas refrigerant, which is light in weight, may be positioned in the inner upper part of the housing 110, and the liquid refrigerant, which is relatively heavy in weight, may be positioned in the inner lower part of the housing 110.

In this state, when the refrigerant is supplied to the compressor 59, the gas refrigerant with the light weight is inflowed from the upper part of the guide pipe 140 to the gas refrigerant flow space 142 inside the housing 110.

While flowing from the upper part of the gas refrigerant flow space 142 to the lower part, the gas refrigerant inflowed into the gas refrigerant flow space 142 inflows into the lower part of the exhaust pipe 130 and flows toward the outlet 124 at the inner lower part of the exhaust pipe 130.

At this time, in the oil collecting part 114, as the oil included in the gas refrigerant is exhausted to the oil hole 146 by its own weight and collected, a pure gas refrigerant may be supplied to the compressor 59 through the exhaust pipe 130.

Also, the liquid refrigerant in the low temperature/low pressure state, which has a relatively heavy weight compared to the gas refrigerant, flows from the upper part to the lower part by its own weight along the inner surface of the housing 110 and is finally stored in the refrigerant storage unit 112.

On the other hand, the receiver dryer 170 may simultaneously remove a foreign material and moisture included in the mixed refrigerant selectively supplied from the internal condenser 52a or the heat-exchanger 54 and separate the gas refrigerant included in the liquid refrigerant.

The liquid refrigerant from which the gas refrigerant is separated may be supplied to the heat-exchanger 54, or the sub-condenser 56 through the exhaust port 176.

That is, the receiver dryer 170 may exhaust the refrigerant to the heat-exchanger 54 when the refrigerant is supplied from the internal condenser 52a. On the other hand, the receiver dryer 170 may exhaust the refrigerant to the sub-condenser 56 when the refrigerant is supplied from the heat-exchanger 54.

Here, as the refrigerants in the gas state that were not condensed while passing through the receiver dryer 170 heat-exchange with the refrigerant in the low temperature/low pressure state stored in the refrigerant storage unit 112, the dryness decreases and the phase change may occur in a liquid state simultaneously.

Accordingly, the flow rate of the liquid refrigerant exhausted through the exhaust port 176 may be increased.

In addition, while the refrigerant in the low temperature/low pressure state stored in the refrigerant storage unit 112 is heat-exchanged with the refrigerant in the high temperature/high pressure state passing through the receiver dryer 170, the dryness increases and simultaneously the phase may be changed into the gas state.

Accordingly, the flow rate of the gas refrigerant exhausted through the exhaust pipe 130 may be increased.

That is, the gas-liquid separation device 100 for the vehicle according to an embodiment of the present disclosure may smoothly separate the refrigerant supplied from the internal condenser 52a or the heat-exchanger 54 into a gas refrigerant and a liquid refrigerant and store them respectively to supply the gas refrigerant to the compressor 59 and the liquid refrigerant to the heat-exchanger 54 or the sub-condenser 56.

Hereinafter, the heat pump system to which the gas-liquid separation device 100 configured as above-described is applied is described in detail with reference to FIG. 7.

Figure 7:
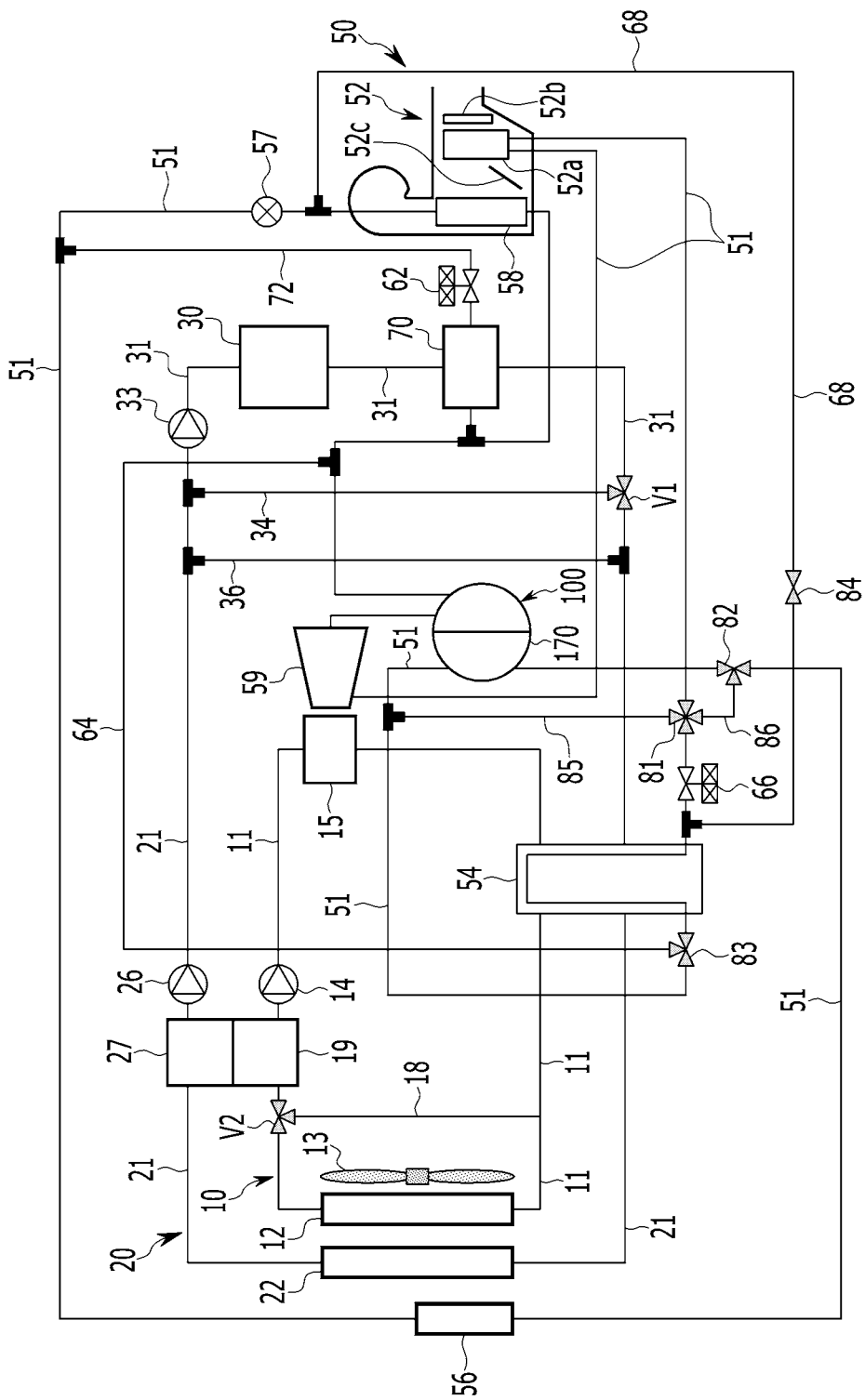
FIG. 7 is a block diagram of a heat pump system equipped with a gas-liquid separation device for a vehicle according to an embodiment of the present disclosure.

FIG. 7 is a block diagram of a heat pump system equipped with a gas-liquid separation device for a vehicle according to an embodiment of the present disclosure.

Referring to FIG. 7, the heat pump system may be applied to the electric vehicle, a first cooling apparatus 10 for cooling the electrical component 15, a second cooling apparatus 20 for cooling the battery module 30, and an air conditioner device 50 which is for cooling or heating an interior may interlock with each other.

That is, referring to FIG. 7, the heat pump system includes the first and second cooling apparatuses 10 and 20, the battery module 30, the air conditioner device 50, the chiller 70, and the gas-liquid separation device 100 as described above.

First, the first cooling apparatus 10 includes a first radiator 12 and a first water pump 14 connected to the first coolant line 11.

This first cooling apparatus 10 circulates the coolant in the first coolant line 11 through the operation of the first water pump 14 to cool at least one electrical component 15 and at least one motor 16.

The first radiator 12 is disposed at the front of the vehicle and the cooling fan 13 is provided at the rear to cool the coolant through the operation of the cooling fan 13 and heat-exchange with the outside air.

Here, the electrical component 15 may include a motor, an autonomous driving controller, a power control apparatus, an inverter, or a charger.

The motor, the autonomous driving controller, the power control apparatus, or the inverter may generate heat while driving, and the charger may generate heat when charging the battery module 30.

That is, the electrical component 15 may be cooled by water cooling by the coolant supplied to the first coolant line 11.

Accordingly, when a waste heat of the electrical component 15 is recovered in the indoor heating mode of the vehicle, heat generated from the power control apparatus, the inverter, the charger, the autonomous driving controller, and the motor may be recovered.

Meanwhile, between the first radiator 12 and the first water pump 14, a first reservoir tank 19 is provided on the first coolant line 11. The coolant cooled in the first radiator 12 may be stored in the first reservoir tank 19.

The first cooling apparatus 10 configured in this way circulates the coolant cooled in the first radiator 12 through the operation of the first water pump 14 along the first coolant line 11, thereby cooling the electrical component 15 to not be overheated.

In the present embodiment, the second cooling apparatus 20 includes a second radiator 22 and a second water pump 26 connected to the second coolant line 21, and circulates the coolant in the second coolant line 21.

This second cooling apparatus 20 may selectively supply the coolant cooled by the second radiator 22 to the battery module 30.

The second radiator 22 is disposed in front of the first radiator 12, and cools the coolant through the operation of the cooling fan 13 and heat-exchange with the outside air.

In addition, a second reservoir tank 27 may be provided in the second coolant line 21 between the second radiator 22 and the second water pump 26. In the second reservoir tank 27, the coolant cooled by the second radiator 22 may be stored.

Here, the first reservoir tank 19 and the second reservoir tank 27 may be integrally formed.

The second cooling apparatus 20 configured in this way may circulate the coolant cooled by the second radiator 22 along the second coolant line 21 through the operation of the second water pump 26.

On the other hand, in the present embodiment, it is described that the second cooling apparatus 20 includes the second radiator 22 as an embodiment, however it is not limited thereto, and the second cooling apparatus 20 may be connected to the first radiator 12 instead of the second radiator 22.

That is, if there is no second radiator 22 in the second cooling apparatus 20, the second coolant line 21 may be connected to the first radiator 12 so that the coolant is supplied from the first radiator 12.

In the present embodiment, the battery module 30 is provided on the battery coolant line 31 selectively connected to the second coolant line 21 through the first valve V1.

Here, the first valve V1 may selectively connect the second coolant line 21 and the battery coolant line 31 between the second radiator 22 and the battery module 30.

More specifically, the first valve V1 selectively connects the second coolant line 21 and the battery coolant line 31 between the chiller 70 and the second radiator 22 provided in the battery coolant line 31.

Here, the battery module 30 supplies power to the electrical component 15, and is formed as a water cooling type that is cooled with the coolant flowing along the battery coolant line 31.

That is, the battery module 30 is selectively connected to the second cooling apparatus 20 through the battery coolant line 31 according to the operation of the first valve V1. Also, in the battery module 30, the coolant may be circulated inside through the operation of the third water pump 33 provided in the battery coolant line 31.

The third water pump 33 operates to circulate the coolant through the battery coolant line 31.

Here, the first, second, and third water pumps 14, 26, and 33 may be electric water pumps.

Meanwhile, in the first cooling apparatus 10, a first branched line 18 connected to the first coolant line 11 between the first radiator 12 and the first water pump 14 through the second valve V2 provided in the first coolant line 11 between the first radiator 12 and the first water pump 14 may be provided.

More specifically, the second valve V2 is provided in the first coolant line 11 between the first radiator 12 and the first reservoir tank 19.

One end of the first branched line 18 is connected to the first coolant line 11 through the second valve V2. The other end of the first branched line 18 may be connected to the first coolant line 11 between the electrical component 15 and the first radiator 12.

The first branched line 18 is selectively opened through the operation of the second valve V2 when the temperature of the coolant is increased by absorbing the waste heat generated by the electrical component 15.

At this time, the first coolant line 11 connected to the first radiator 12 is closed through the operation of the second valve V2.

In the present embodiment, the chiller 70 is provided in the battery coolant line 31, the coolant passes therein, and is connected to the refrigerant line 51 of the air conditioner device 50 through the chiller connection line 72.

The chiller 70 may control the temperature of the coolant by heat-exchanging the coolant selectively inflowed inside with the refrigerant supplied from the air conditioner device 50. Here, the chiller 70 may be a water-cooled heat-exchanger into which the coolant is inflowed.

In addition, the battery coolant line 31 may include a second branched line 34 that connects each battery coolant line 31 between the chiller 70 and the battery module 30 through the first valve V1.

That is, the second branched line 34 selectively separate the second coolant line 21 and the battery coolant line 31 according to the operation of the first valve V1 so that the battery coolant line 31 forms a closed and sealed circuit independent of the second cooling apparatus 20.

Also, in the second coolant line 21, a third branched line 36 that separates the battery coolant line 31 and the second coolant line 21 is provided.

The third branched line 36 may be selectively connected to the second coolant line 21 so that the second cooling apparatus 20 forms an independent closed and sealed circuit through the second coolant line 21.

Meanwhile, a separate valve may be provided at a point where the third branched line 36 intersects the second coolant line 21 and the battery coolant line 31, or the third branched line 36. These valves may be 3-way or 2-way valves.

Accordingly, the first valve V1 selectively connects the second coolant line 21 and the battery coolant line 31 or selectively connects the battery coolant line 31 and the second branched line 34 to control the flow of the coolant.

That is, when cooling the battery module 30 by using the coolant cooled by the second radiator 22, the first valve V1 may connect the second coolant line 21 and the battery coolant line 31 connected to the second radiator 22, and close the second branched line 34.

Then, the coolant cooled by the second radiator 22 may flow along the second coolant line 21 and the battery cooling line 31 connected through the operation of the first valve V1 and then cool the battery module 30.

Also, when cooling the battery module 30 by using the coolant heat-exchanged with the refrigerant, the first valve V1 may open the second branched line 34 and close the connection between the second coolant line 21 and the battery coolant line 31.

Accordingly, the coolant of a low temperature, in which heat-exchange with the refrigerant has been completed in the chiller 70, inflows into the battery module 30 through the second branched line 34 opened by the first valve V1, thereby efficiently cooling the battery module 30.

On the other hand, in the present embodiment, the valve is not configured in the third branched line 36 as an embodiment, but it is not limited thereto, and the application of the valve as needed for the selective opening of the third branched line 36 is possible.

That is, the third branched line 36 is able to control the flow rate of the coolant circulated through the second coolant line 21, the battery coolant line 31, and second branched line 34, which are selectively connected, and the operation of the second and third water pumps 26 and 33, thereby the opening and closing control of the third branched line 36 is possible.

On the other hand, in the present embodiment, the air conditioner device 50 may circulate the refrigerant in the refrigerant line 51 to control the temperature of the vehicle interior by using the phase change of the refrigerant.

This air conditioner device 50 includes a heating, ventilation, and air conditioning (HVAC) module 52, the heat-exchanger 54, the sub-condenser 56, the evaporator 58, a first expansion valve 57, the compressor 59, and the gas-liquid separation device 100, which are connected through the refrigerant line 51.

First, the HVAC module 52 is connected through the refrigerant line 51 and is provided with an opening/closing door 52c inside so that the outside air that has passed through the evaporator 58 selectively inflows to the internal condenser 52a and the internal heater 52b according to the mode selected for the temperature adjustment of the interior of the vehicle.

That is, when the interior of the vehicle is heated, the opening/closing door 52c is opened so that the outside air passing through the evaporator 58 inflows to the internal condenser 52a and the internal heater 52b.

Conversely, when cooling the vehicle's interior, the opening/closing door 52c closes the internal condenser 52a and the internal heater 52b side so that the outside air cooled while passing through the evaporator 58 flows directly into the vehicle.

The heat-exchanger 54 is connected to the refrigerant line 51 so that the refrigerant passes, and is respectively connected to the first and second coolant lines 11 and 21 so that the coolant circulating in the first and second cooling apparatuses 10 and 20 passes.

This heat-exchanger 54 may condense or evaporate the refrigerant through the heat-exchange with the coolant supplied through the first and second coolant lines 11 and 21 according to the indoor cooling mode or indoor heating mode of the vehicle.

That is, the refrigerant passing through the heat-exchanger 54 may be expanded or evaporated selectively according to cooling to the indoor cooling mode or indoor heating mode of the vehicle through the mutual heat-exchange with the coolant supplied from any one of the first coolant line 11 and the second coolant line 21, or the coolant supplied through each of the first and second coolant lines 11 and 21.

The heat-exchanger 54 may be a water-cooled heat exchanger in which the coolant is inflowed.

In the heat-exchanger 54 configured in this way, each coolant with the different temperatures circulating in the first cooling apparatus 10 and the second cooling apparatus 20 flows, and at this time, the refrigerant inflowed to the coolant may be heat-exchanged with each coolant having the different temperatures.

Through this operation, the heat-exchanger 54 may increase the amount of the condensation or the amount of the evaporation of the refrigerant.

On the other hand, the refrigerant line 51 between the heat-exchanger 54 and the evaporator 58 may be provided with a sub-condenser 56 for further condensing the refrigerant that has passed through the heat-exchanger 54.

This sub-condenser 56 is disposed in front of the second radiator 22 to mutually heat-exchange the refrigerant inflowed inside with the outside air.

As such, when the heat-exchanger 54 condenses the refrigerant, the sub-condenser 56 further condenses the refrigerant condensed in the heat-exchanger 54, thereby increasing sub-cooling of the refrigerant, thereby a coefficient of performance (COP), which is a coefficient of a cooling capacity compared to a required compressor power, may be improved.

Here, the gas-liquid separation device 100 may be selectively connected to the internal condenser 52a, the heat-exchanger 54, the sub-condenser 56, and the evaporator 58.

On the other hand, in the present embodiment, the first expansion valve 57 is provided in the refrigerant line 51 connecting the sub-condenser 56 and the evaporator 58. The first expansion valve 57 receives the refrigerant that has passed through the sub-condenser 56 and expands it. This first expansion valve 57 may be a mechanical expansion valve.

The compressor 59 is connected via the refrigerant line 51 between the evaporator 58 and the internal condenser 52a. This compressor 59 may compress the refrigerant in the gas state and supply the compressed refrigerant to the internal condenser 52a.

The air conditioner device 50 configured in this way may further include a second expansion valve 62, a first bypass line 64, a third expansion valve 66, and a second bypass line 68.

First, the second expansion valve 62 is provided in the chiller connection line 72 between the sub-condenser 56 and the chiller 70.

Here, the second expansion valve 62 is operated when cooling the battery module 30 using the coolant heat-exchanged with the refrigerant in the indoor cooling mode of the vehicle. The second expansion valve 62 may expand the refrigerant inflowed through the chiller connection line 72 to inflow into the chiller 70.

That is, the second expansion valve 62 expands the condensed refrigerant discharged from the sub-condenser 56 and makes the expanded refrigerant flow into the chiller 70 in a state where the refrigerant is lowered in temperature, thereby further lowering a water temperature of the coolant passing through the inside the chiller 70.

Accordingly, the coolant having the lowered water temperature flows into the battery module 30 while passing through the chiller 70, so that the battery module 30 may be cooled more efficiently.

In the present embodiment, the first bypass line 64 may connect the refrigerant line 51 connecting the evaporator 58 and the gas-liquid separation device 100, and the heat-exchanger 54, so that the refrigerant passing through the heat-exchanger 54 selectively inflows to the gas-liquid separation device 100.

Here, the heat pump system may further include a first refrigerant valve 81, a second refrigerant valve 82, a third refrigerant valve 83, a fourth refrigerant valve 84, a first refrigerant connection line 85, and a second refrigerant connection line 86.

First, the first refrigerant valve 81 may be provided in the refrigerant line 51 connecting the internal condenser 52a and the heat-exchanger 54.

The second refrigerant valve 82 may be provided in the refrigerant line 51 connecting the gas-liquid separation device 100 and the sub-condenser 56.

One end of the first refrigerant connection line 85 may be connected to the refrigerant line 51 which connects the heat-exchanger 54 and the gas-liquid separation device 100. The other end of the first refrigerant connection line 85 may be connected to the first refrigerant valve 81.

Also, the second refrigerant connection line 86 may connect the first refrigerant valve 81 and the second refrigerant valve 82.

This second refrigerant connection line 86 may be opened by the operation of the second refrigerant valve 82 when the refrigerant supplied from the internal condenser 52a by the operation of the first refrigerant valve 81 flows into the first refrigerant connection line 85.

At this time, the refrigerant line 51 connecting the second refrigerant valve 82 and the sub-condenser 56 may be closed by the operation of the second refrigerant valve 82.

Conversely, when the refrigerant line 51 connected to the heat-exchanger 54 is opened by the operation of the first refrigerant valve 81, and the first refrigerant connection line 85 is closed, the second refrigerant connection line 86 may be closed by the operation of the second refrigerant valve 82.

On the other hand, in the present embodiment, the third refrigerant valve 83 may be provided in the refrigerant line 51 connecting the heat-exchanger 54 and the gas-liquid separation device 100.

Accordingly, one end of the first bypass line 64 may be connected to the refrigerant line 51 that connects the heat-exchanger 54 and the gas-liquid separation device 100 through the third refrigerant valve 83.

Also, the other end of the first bypass line 64 may be connected to the refrigerant line 51 between the evaporator 58 and the gas-liquid separation device 100.

The third refrigerant valve 83 may selectively open the first bypass line 64 according to the indoor cooling mode or indoor heating mode of the vehicle.

Accordingly, the first bypass line 64 opened through the operation of the third refrigerant valve 83 may supply the gas refrigerant that has passed through the gas-liquid separation device 100 in the indoor heating mode of the vehicle to the compressor 59.

In addition, the heat-exchanger 54 may supply the liquid refrigerant to the receiver dryer 170 of the gas-liquid separation device 100 through the refrigerant line 51 opened through the operation of the third refrigerant valve 83.

That is, the gas-liquid separation device 100 may supply the gas refrigerant to the compressor 59 among the refrigerants supplied through the first bypass line 64, which is selectively opened through the operation of the third refrigerant valve 83.

Accordingly, the gas-liquid separation device 100 supplies only the refrigerant in the gas state to the compressor 59, thereby improving the efficiency and durability of the compressor 59.

Also, the receiver dryer 170 of the gas-liquid separation device 100 may supply the liquid refrigerant to the refrigerant line 51, which is selectively opened through the operation of the second refrigerant valve 82.

That is, the liquid refrigerant that has passed through the receiver dryer 170 in the gas-liquid separation device 100 may be supplied to the sub-condenser 56 through the refrigerant line 51 opened through the operation of the second refrigerant valve 82.

The gas-liquid separation device 100 configured in this way may be disposed on the refrigerant line 51 between the compressor 59 and the evaporator 58.

In the present embodiment, the third expansion valve 66 may be provided on the refrigerant line 51 between the internal condenser 52a and the heat-exchanger 54.

This third expansion valve 66 may expand the refrigerant supplied from the internal condenser 52a when the dehumidification is required in the indoor heating mode of the vehicle.

Here, when the third expansion valve 66 expands the refrigerant, the heat-exchanger 54 evaporates the refrigerant through heat-exchange with the coolant, and when the third expansion valve 66 does not expand the refrigerant, may condense the refrigerant through heat-exchange with the coolant.

Also, the second bypass line 68 may be connected to the refrigerant line 51 between the heat-exchanger 54 and the third expansion valve 66, and the first refrigerant line 51 between the first expansion valve 57 and the evaporator 58, so that some refrigerant of the refrigerant that has passed through the internal condenser 52a is selectively inflowed to the evaporator 58.

Here, the second bypass line 68 may be provided with a fourth refrigerant valve 84. The fourth refrigerant valve 84 may selectively open the second bypass line 68 in the dehumidification mode among the vehicle modes.

That is, the fourth refrigerant valve 84 may open the second bypass line 68 so that refrigerant expanded by the operation of the third expansion valve 66 inflows to the second bypass line 68.

Accordingly, when the dehumidification is required during the indoor heating mode of the vehicle, the second bypass line 68 inflows some of the refrigerant expanded through the operation of the third expansion valve 66 to the evaporator 58, the indoor dehumidification may be performed without the operation of the first expansion valve 57.

In the heat pump system configured as described above, the second expansion valve 62 and the third expansion valve 66 may be electronic expansion valves that selectively expand the refrigerant while controlling the flow of the refrigerant.

In addition, the first and second valves V1 and V2 may 3-way valves capable of distributing the flow.

Also, the first refrigerant valve 81 may be a 4-way valve, the second and third refrigerant valves 82 and 83 may be 3-way valves, and the fourth refrigerant valve 84 may be a 2-way valve.

Hereinafter, the operation and action of the heat pump system configured as described above is described in detail with reference to FIG. 8 and FIG. 9.

First, the operation for the cooling mode of the vehicle interior is described in detail with reference to FIG. 8.

Figure 8:
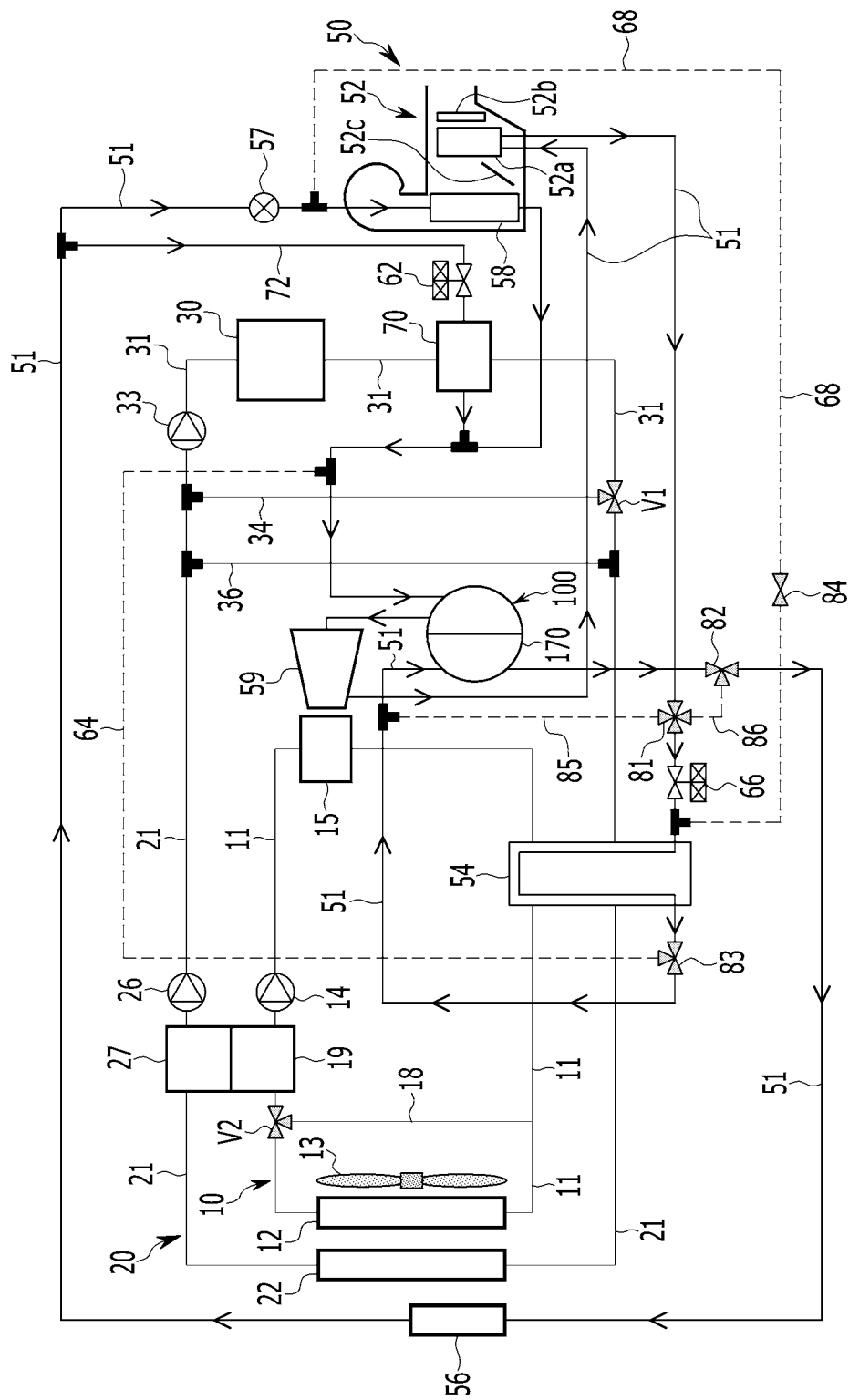
FIG. 8 is an operation state diagram for a cooling mode of a vehicle interior in a heat pump system equipped with a gas-liquid separation device for a vehicle according to an embodiment of the present disclosure.

FIG. 8 is an operation state diagram for a cooling mode of a vehicle interior in a heat pump system equipped with a gas-liquid separation device for a vehicle according to an embodiment of the present disclosure.

Referring to FIG. 8, the heat pump system may be operated to cool the interior of the vehicle.

Meanwhile, in explaining the operation of the air conditioner device 50 and the gas-liquid separation device 100 of the heat pump system, a detailed description of the flow of the coolant in the first and second cooling apparatus 10 and 20 is omitted.

Referring to FIG. 8, in the air conditioner device 50, the first and second bypass lines 64 and 68 may be closed by the operation of the third and fourth refrigerant valves 83 and 84, respectively.

The first and second refrigerant connection lines 85 and 86 are closed by the operation of the first and second refrigerant valves 81 and 82.

Then, the refrigerant supplied from the compressor 59 flows into the internal condenser 52a along the refrigerant line 51. Then, the refrigerant passing through the internal condenser 52a may be supplied to the heat-exchanger 54 along the refrigerant line 51 opened by the operation of the first refrigerant valve 81.

Here, the third expansion valve 66 may supply the refrigerant to the heat-exchanger 54 without expansion.

The heat-exchanger 54 may condense the refrigerant through heat-exchange with the coolant supplied from the first cooling apparatus 10 or the second cooling apparatus 20.

The refrigerant condensed in the heat-exchanger 54 may be inflowed to the receiver dryer 170 of the gas-liquid separation device 100 along the refrigerant line 51 opened by the operation of the third refrigerant valve 83.

The refrigerant that has passed through the gas-liquid separation device 100 passes through the sub-condenser 56 along the refrigerant line 51 opened by the operation of the second refrigerant valve 82.

Here, the sub-condenser 56 may further condense the refrigerant inflowed from the heat-exchanger 54 through heat-exchange with outside air.

Also, the refrigerant that has passed through the sub-condenser 56 may be circulated along the refrigerant line 51. The first expansion valve 57 may expand the refrigerant so that the expanded refrigerant is supplied to the evaporator 58.

Here, the outside air inflowed to the HVAC module 52 is cooled while passing through the evaporator 58 by the refrigerant in a low temperature state inflowed to the evaporator 58.

At this time, the opening/closing door 52c closes the part passing through the internal condenser 52a so that the cooled outside air does not pass through the internal condenser 52a. Therefore, the cooled outside air may be directly inflowed into the interior of the vehicle, thereby cooling the vehicle interior.

Meanwhile, the coolant having an amount of the condensation that is increased while sequentially passing through the heat-exchanger 54 and the sub-condenser 56 may be expanded and supplied to the evaporator 58, so that the refrigerant may be evaporated to a lower temperature.

That is, in the present embodiment, the heat-exchanger 54 condenses the refrigerant, and the sub-condenser 56 further condenses the refrigerant, which is advantageous in performing subcooling of the refrigerant.

In addition, as the refrigerant having undergone the subcooling is evaporated to a lower temperature in the evaporator 58, a temperature of the outside air passing through the evaporator 58 may be further lowered, thereby improving cooling performance and efficiency.

Meanwhile, the expanded refrigerant passes through the evaporator 58 and then inflows along the refrigerant line 51 to the gas-liquid separation device 100. The gas-liquid separation device 100 may supply the gas refrigerant to the compressor 59.

That is, the gas-liquid separation device 100 may supply the liquid refrigerant to the sub-condenser 56 after removing the gas refrigerant from the refrigerant that has passed through the heat-exchanger 54. In addition, the gas-liquid separation device 100 may supply the gas refrigerant to the compressor 59 after removing the liquid refrigerant from the refrigerant that has passed through the evaporator 58.

That is, the heat pump system may cool the vehicle interior while repeating the operations as described above in the indoor cooling mode of the vehicle.

On the other hand, when cooling the battery module 30 in the indoor cooling mode of the vehicle, the coolant may be supplied to the chiller 70.

The coolant that has passed through the chiller 70 circulates through the battery coolant line 31 to cool the battery module 30 through the operation of the third water pump 33.

Here, some of the refrigerant that has passed through the sub-condenser 56 may be supplied to the chiller 70 along the chiller connection line 72 opened by the operation of the second expansion valve 62.

At this time, the coolant passing through the chiller 70 is cooled through heat-exchange with the expanded refrigerant supplied to the chiller 70. The coolant cooled by the chiller 70 is supplied to the battery module 30. Accordingly, the battery module 30 is cooled by the cooled coolant.

That is, the second expansion valve 62 expands some of the refrigerant that has passed through the sub-condenser 56 to supply the expanded refrigerant to the chiller 70, and opens the chiller connection line 72.

Accordingly, some refrigerant exhausted from the sub-condenser 56 is expanded through the operation of the second expansion valve 62 and becomes a state of the low temperature/low pressure, and flows into the chiller 70 connected to the chiller connection line 72.

Then, the refrigerant inflowed into the chiller 70 is heat-exchanged with the coolant, passes through the gas-liquid separation device 100 along the refrigerant line 51 connected to the chiller connection line 72, and then inflows to the compressor 59.

Accordingly, the coolant whose temperature rises while cooling the battery module 30 is cooled through heat-exchange with the refrigerant of low temperature/low pressure inside the chiller 70. The cooled coolant is supplied back to the battery module 30 along the battery coolant line 31.

That is, the coolant circulated in the battery cooling line 31 may efficiently cool the battery module 30 while repeating the operation as described above.

Next, the operation for the indoor heating mode of the vehicle is described with reference to FIG. 9.

Figure 9:
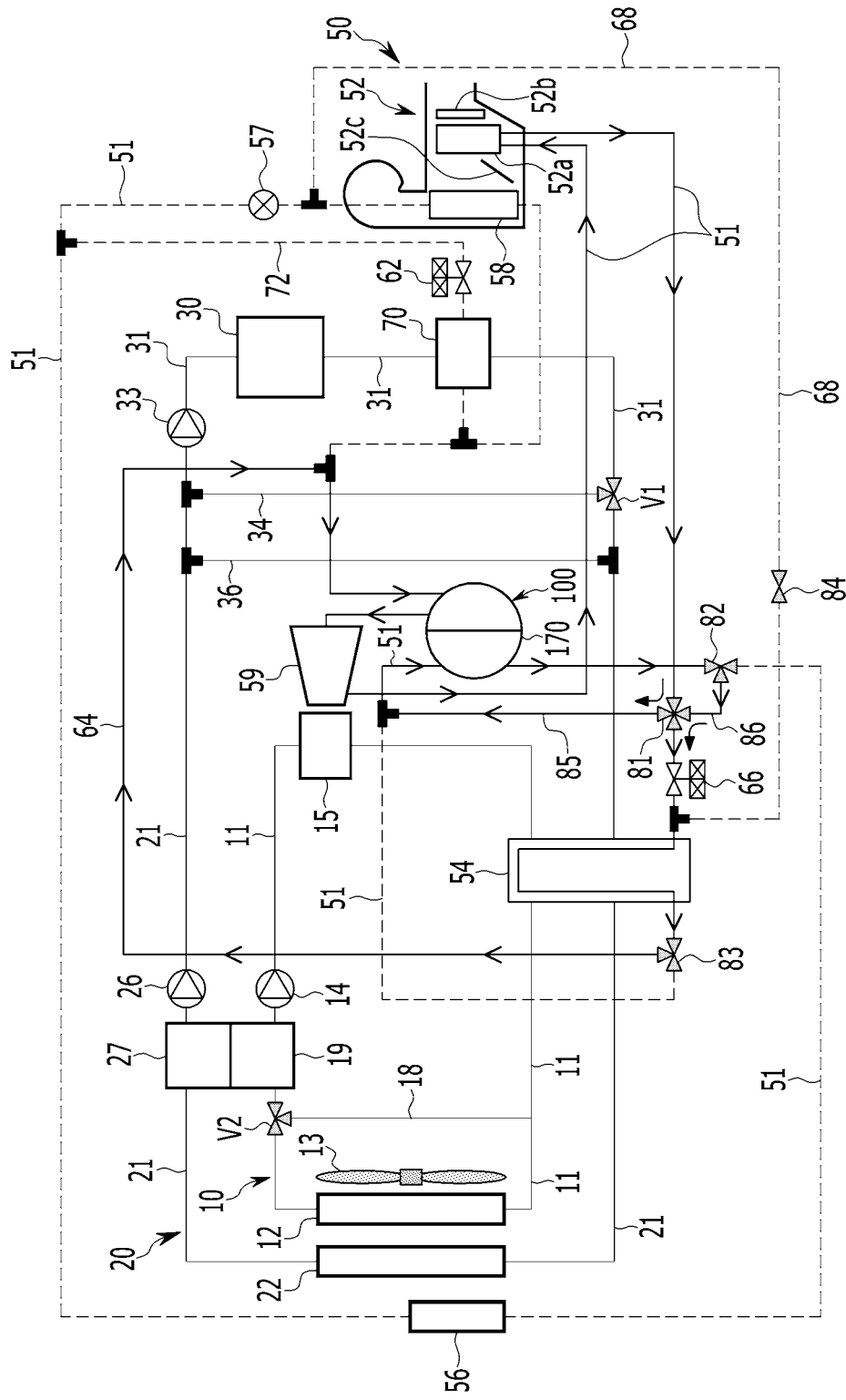
FIG. 9 is an operation state diagram for a heating mode of a vehicle interior in a heat pump system equipped with a gas-liquid separation device for a vehicle according to an embodiment of the present disclosure.

FIG. 9 is an operation state diagram for a heating mode of a vehicle interior in a heat pump system equipped with a gas-liquid separation device for a vehicle according to an embodiment of the present disclosure.

Referring to FIG. 9, in the air conditioner device 50, the refrigerant line 51 connecting the heat-exchanger 54 and the gas-liquid separation device 100 may be closed by the operation of the third refrigerant valve 83.

The first bypass line 64 may be opened by the operation of the third refrigerant valve 83, and the second bypass line 68 may be closed by the operation of the fourth refrigerant valve 84, respectively.

The first and second refrigerant connection lines 85 and 86 are opened by operation of the first and second refrigerant valves 81 and 82.

Then, the refrigerant supplied from the compressor 59 flows into the internal condenser 52a along the refrigerant line 51.

The refrigerant that has passed the internal condenser 52a may be supplied to the gas-liquid separation device 100 along the first refrigerant connection line 85 opened by the operation of the first refrigerant valve 81 and the refrigerant line 51 connected to the first refrigerant connection line 85.

The refrigerant that has passed through the gas-liquid separation device 100 flows along the second refrigerant connection line 86 opened by the second refrigerant valve 82. Then, the refrigerant can inflow into the heat-exchanger 54 along the refrigerant line 51 opened by the operation of the first refrigerant valve 81.

Here, the third expansion valve 66 may supply the refrigerant to the heat-exchanger 54 by expanding the supplied refrigerant.

Accordingly, the heat-exchanger 54 may evaporate the refrigerant by heat-exchanging the refrigerant supplied from the third expansion valve 66 with the coolant supplied from the first cooling apparatus 10 or the second cooling apparatus 20.

Meanwhile, the coolant circulating in the first cooling apparatus 10 or the second cooling apparatus 20 increases the temperature while cooling the electrical component 15 or the battery module 30. The coolant with increased temperature inflows to the heat-exchanger 54.

At this time, the heat-exchanger 54 may recover the waste heat from the coolant through heat-exchange of the supplied refrigerant and each coolant to be used for indoor heating of the vehicle.

That is, the gas-liquid separation device 100 may remove the gas refrigerant from the refrigerant supplied from the internal condenser 52a to the receiver dryer 170 through the first refrigerant connection line 85, and then supply the liquid refrigerant to the heat-exchanger 54 through the second refrigerant connection line 86 and the refrigerant line 51.

In addition, the gas-liquid separation device 100 may supply the gas refrigerant to the compressor 59 after removing the liquid refrigerant from refrigerant evaporated while passing through the heat-exchanger 54.

On the other hand, the opening/closing door 52c is opened so that the outside air inflowed to the HVAC module 52 and passing through the evaporator 58 passes through the internal condenser 52a.

Accordingly, the outside air inflowed from the outside is inflowed in the uncooled room temperature state when passing through the evaporator 58 to which the refrigerant is not supplied. The inflowed outdoor air is converted to a high temperature state while passing through the internal condenser 52a and inflowed into the vehicle interior, thereby realizing the heating of the vehicle interior.

Here, the internal heater 52b may be selectively operated according to the temperature of the external air that has passed through the internal condenser 52a.

That is, the internal heater 52b may be operated when the temperature of the outside air passing through the internal condenser 52a is lower than the target temperature to heat the outside air flowing into the interior of the vehicle.

The internal heater 52b is operated when the temperature of the outdoor air of which the heat-exchange with the refrigerant of a high temperature is completed while passing through the internal condenser 52a is lower than a predetermined temperature, or a heating target temperature.

When the internal heater 52b is operated, the outdoor air may be heated while passing through the internal heater 52b and inflow into the vehicle interior while the temperature is increased.

That is, the heat pump system according to the present embodiment is used in increasing the temperature of the refrigerant by using the waste heat of the electrical component 15 and the battery module 30 in the heat-exchanger 54 when the indoor heating of the vehicle is required, thereby reducing the power consumption of the compressor 59 and improving the heating efficiency.

That is, the heat pump system may heat the vehicle interior while repeating the above-described operation.

Meanwhile, although not shown in the drawing, when the dehumidification is required in the indoor heating mode of the vehicle, the second bypass line 68 may be opened by the operation of the fourth refrigerant valve 84.

Accordingly, some refrigerant of the refrigerant expanded through the operation of the third expansion valve 66 may be inflowed to the evaporator 58 through the opened second bypass line 68. The refrigerant that has passed through the evaporator 58 may be supplied to the compressor 59 after passing through the gas-liquid separation device 100.

Here, the outside air inflowed to the HVAC module 52 is dehumidified while passing through the evaporator 58 by the refrigerant in a low temperature state inflowed to the evaporator 58. Then, it is converted to a high temperature state while passing through the internal condenser 52a and inflows into the vehicle interior, so that the interior of the vehicle may be heated and dehumidified.

That is, when the dehumidification is required in the indoor heating mode of the vehicle, the heat pump system may perform the indoor dehumidification without the operation of the first expansion valve 57.

Therefore, when applying the gas-liquid separation device 100 for the vehicle and the heat pump system having the same according to an embodiment of the present disclosure configured as described above, by dividing the refrigerant supplied according to the mode of the vehicle into the gas refrigerant and the liquid refrigerant and storing them, and selectively supplying the separated gas refrigerant and liquid refrigerant to the compressor 59, the heat-exchanger 54, or the sub-condenser 56, respectively, it is possible to reduce the production cost by reducing the entire constituent elements of the air conditioner device 50.

In addition, as the present disclosure simultaneously performs the functions of the receiver dryer and the accumulator, which were conventionally configured separately, a mount space may be secured through the reduction of constituent elements, and simultaneously a layout may be simplified.

In addition, the present disclosure may improve the cooling and heating performance of the air conditioner device 50 by minimizing the flow rate of the refrigerant accumulated therein to increase the flow rate of the refrigerant circulating during the indoor cooling or heating of the vehicle.

Furthermore, the present disclosure may reduce the weight through the simplification of the entire system, and may improve the space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A gas-liquid separation device for a vehicle comprising:
   a housing with an upper surface that is opened and a lower surface that is closed based on a length direction;
   a cover mounted on the opened upper surface of the housing, the cover being configured to close and seal the interior of the housing, and the cover comprising an outlet positioned in a center of the cover, an inlet positioned on a first side of the cover, and a mount hole positioned on a second side of the cover;
   an exhaust pipe mounted on the cover so that the upper part protrudes from the outlet;
   a guide pipe having a cylinder shape with an open upper surface so that the exhaust pipe is inserted inside the guide pipe, the guide pipe forming a gas refrigerant flow space between an exterior circumference and an interior circumference of the exhaust pipe;
   a mount cap mounted inside the closed lower surface of the housing to fix the closed lower surface of the guide pipe;
   a refrigerant guider positioned on a cover side of the housing in the interior of the housing, the refrigerant guider being configured to prevent liquid refrigerant of the refrigerant inflowed into the inlet from flowing into the gas refrigerant flow space, and fixed to the exhaust pipe; and
   a receiver dryer mounted through the mount hole so that an upper part of the receiver dryer is protruded to the outside of the cover and a lower part of the receiver dryer is positioned inside the housing.

2. The gas-liquid separation device for the vehicle of claim 1, wherein
   in the guide pipe,
   at least one fixing rib on an inner lower part of the interior circumference of the guide pipe is protrudes toward a center of the guide pipe so that the exhaust pipe is fixed to the inner lower part of the guide pipe.

3. The gas-liquid separation device for the vehicle of claim 1, wherein
   the guide pipe further comprises
   an oil exhaust part protruding from the lower center toward the inner lower surface of the housing and including an oil hole configured to communicate with the housing.

4. The gas-liquid separation device for the vehicle of claim 3, wherein
   the housing further comprises
   an oil collecting part protruding from the lower surface of the housing toward a lower part of the housing by corresponding to the oil exhaust part.

5. The gas-liquid separation device for the vehicle of claim 4, wherein
   in the oil collecting part,
   when oil included in the gas refrigerant flowing in the gas refrigerant flow space is exhausted into the oil hole, the oil is collected by its own weight from the oil exhaust part.

6. The gas-liquid separation device for the vehicle of claim 1, wherein
   in the mount cap,
   an upper surface of the mount cap is opened and a lower surface of the mount cap is closed so that the lower end of the guide pipe is partially inserted, and at least one opening hole is formed along the circumferential direction to allow the liquid refrigerant stored inside the housing to flow.

7. The gas-liquid separation device for the vehicle of claim 1, wherein
   the exhaust pipe includes:
   a fixing groove formed at an upper end of the exhaust pipe to be fixed to the cover at a position where the upper end is protruded outward from the cover at a regular interval; and
   a mount groove formed in a position spaced from the fixing groove toward the lower end of the exhaust pipe so that the refrigerant guider is positioned on the upper part at the inside of the housing, and for fixing the refrigerant guider.

8. The gas-liquid separation device for the vehicle of claim 7, wherein
   the interior circumference of the inlet is inserted into the fixing groove and fixed,
   the interior circumference of the inserting groove formed in the refrigerant guider is inserted into the mount groove and fixed.

9. The gas-liquid separation device for the vehicle of claim 1, wherein
   the inlet is connected to a heat-exchanger, an evaporator, or an internal condenser for condensing or evaporating the refrigerant, and the outlet is connected to a compressor.

10. The gas-liquid separation device for the vehicle of claim 1, wherein
    the receiver dryer includes:
    a body part provided with a drying material inside;

an inflow port formed at the upper end of the body part protruded from the mount hole to the outside of the cover; and an exhaust port connected with the body part on the inside of the housing and protruded outside the lower part of the housing.

11. The gas-liquid separation device for the vehicle of claim 10, wherein the inflow port is selectively connected to an internal condenser or a heat-exchanger, and the exhaust port is selectively connected to the heat-exchanger or the sub-condenser.

12. The gas-liquid separation device for the vehicle of claim 1, wherein in the housing, a refrigerant storage unit is formed in a predetermined section from the lower part toward the upper part based on the length direction.

13. The gas-liquid separation device for the vehicle of claim 12, wherein the receiver dryer is positioned on the refrigerant storage unit with the lower end disposed on the inside of the housing.

14. A heat pump system comprising:

a first cooling apparatus including a first radiator and a first water pump connected into a first coolant line, wherein the first cooling apparatus is configured to circulate a coolant in the first coolant line to cool at least one electrical component and at least one motor;

a second cooling apparatus including a second water pump connected to the second coolant line, wherein the second cooling apparatus is configured to circulate a coolant in the second coolant line;

a battery module provided on a battery coolant line selectively connected to the second coolant line through a first valve;

an air conditioner device configured to circulate a refrigerant in the refrigerant line to control the temperature of the vehicle interior by using a phase change of the refrigerant, and including the gas-liquid separation device according to claim 1; and a chiller provided in the battery coolant line and through which a coolant passes, connected to the air conditioner device through a chiller connection line, and heat-exchanging a coolant selectively inflowed with a refrigerant selectively suppled through the chiller connection line to adjust a temperature of a coolant;

wherein the gas-liquid separation device is connected to a heat-exchanger, an internal condenser, an evaporator, and a sub-condenser included in the air conditioner device.

15. The heat pump system of claim 14, wherein the air conditioner device includes:

an HVAC module connected through the refrigerant line, and including an opening and closing door for inflowing external air that has passed through the evaporator to the internal condenser according to the cooling, heating, and dehumidification mode of the vehicle;

a heat-exchanger connected to the first and second coolant lines so that the coolant circulating in the first and second cooling apparatus passes therein, and connected to the refrigerant line;

a first expansion valve provided on the refrigerant line connecting the heat-exchanger and the evaporator;

a compressor connected through the refrigerant line between the evaporator and the internal condenser;

a second expansion valve provided on the chiller connection line;

a first bypass line connecting the refrigerant line connecting the evaporator and the gas-liquid separation device, and the heat-exchanger, so that a refrigerant that has passed through the heat-exchanger is selectively inflowed to the gas-liquid separation device;

a third expansion valve provided on the refrigerant line between the internal condenser and the heat-exchanger; and a second bypass line connecting the refrigerant line between the heat-exchanger and the third expansion valve and the refrigerant line between the first expansion valve and the evaporator so that a refrigerant that passes through the internal condenser selectively inflows into the evaporator.

16. The heat pump system of claim 15, wherein the sub-condenser is provided on the refrigerant line connecting the gas-liquid separation device and the evaporator, and the sub-condenser, when the heat-exchanger condenses the refrigerant, further condenses the refrigerant condensed in the heat-exchanger through heat-exchange with the outside air.

17. The heat pump system of claim 15, further comprising:

a first refrigerant valve provided on the refrigerant line connecting the internal condenser and the heat-exchanger;

a second refrigerant valve provided on the refrigerant line connecting the gas-liquid separation device and the sub-condenser;

a first refrigerant connection line including one end connected to the refrigerant line connecting the heat-exchanger and the gas-liquid separation device and the other end connected to the first refrigerant valve; and a second refrigerant connection line connecting the first refrigerant valve and the second refrigerant valve.

18. The heat pump system of claim 17, wherein one end of the first bypass line is connected to the refrigerant line through a third refrigerant valve provided on the refrigerant line connecting the heat-exchanger and the gas-liquid separation device, an other end of the first bypass line is connected to the refrigerant line between the evaporator and the gas-liquid separation device, a fourth refrigerant valve is provided on the second bypass line.

19. The heat pump system of claim 18, wherein in a case of an indoor cooling mode of a vehicle, the first and second bypass lines are closed by the operation of the third and fourth refrigerant valves, the first and second refrigerant connection lines are closed by the operation of the first and second refrigerant valves, the gas-liquid separation device removes a gas refrigerant from the refrigerant passing through the heat-exchanger and then supplies a liquid refrigerant to the sub-condenser, and removes the liquid refrigerant from the refrigerant passing through the evaporator and then supplies the gas refrigerant to the compressor.

20. The heat pump system of claim 18, wherein when the vehicle is in the indoor heating mode, the refrigerant line connecting the heat-exchanger and the gas-liquid separation device is closed by the operation of the third refrigerant valve, the first bypass line is opened by the operation of the third refrigerant valve, the second bypass line is closed by the operation of the fourth refrigerant valve, the first and second refrigerant connection lines are opened by the operation of the first and second refrigerant valves, and the gas-liquid separation device removes a gas refrigerant from a refrigerant supplied from the internal condenser through the first refrigerant connection line and then supplies a liquid refrigerant to the heat-exchanger through the second refrigerant connection line, and removes a liquid refrigerant from a refrigerant passing through the heat-exchanger and then supplies a gas refrigerant to the compressor.

21. The heat pump system of claim 15, wherein the second expansion valve is operated when cooling the battery module by using a coolant heat-exchanged with a refrigerant and expands a refrigerant inflowed through the chiller connection line to be inflowed to the chiller.

22. The heat pump system of claim 15, wherein the third expansion valve expands a refrigerant supplied from the internal condenser when dehumidification is required in the indoor heating mode of the vehicle, and the fourth refrigerant valve opens the second bypass line so that the refrigerant expanded by the operation of the third expansion valve inflows to the second bypass line.

* * * * *